US012714985B2

(12) United States Patent
Golden et al.

(10) Patent No.: US 12,714,985 B2
(45) Date of Patent: Aug. 25, 2026

(54) ADSORBENT MATERIAL, ADSORPTION SYSTEM, AND ADSORPTION PROCESS

(71) Applicant: Air Products and Chemicals, Inc., Allentown, PA (US)

(72) Inventors: Timothy Christopher Golden, Nevez (FR); Martin Hartmann, Herzogenaurach (DE); Matthias Thommes, Ebensfeld (DE); Roger D. Whitley, Allentown, PA (US); Garret C. Lau, New Tripoli, PA (US); Jeffrey R. Hufton, Fogelsville, PA (US); William J. Casteel, Jr., Fountain Hill, PA (US); Shubhra Jyoti Bhadra, Naperville, IL (US)

(73) Assignee: Air Products and Chemicals, Inc., Allentown, PA (US)

( * ) Notice: Subject to any disclaimer, the term of this patent is extended or adjusted under 35 U.S.C. 154(b) by 385 days.

(21) Appl. No.: 18/501,069

(22) Filed: Nov. 3, 2023

(65) Prior Publication Data

US 2025/0144601 A1 May 8, 2025

(51) Int. Cl.

*B01J 20/04* (2006.01)
*B01D 53/04* (2006.01)

(Continued)

(52) U.S. Cl.

CPC ........ *B01J 20/3265* (2013.01); *B01D 53/047* (2013.01); *B01J 20/18* (2013.01);

(Continued)

(58) Field of Classification Search

CPC ........ B01J 20/3265; B01J 20/18; B01J 20/20; B01J 20/22; B01J 20/28052;

(Continued)

(56) References Cited

U.S. PATENT DOCUMENTS 3,176,444 A 4/1965 Kiyonaga
3,252,268 A 5/1966 Stark (Continued)

FOREIGN PATENT DOCUMENTS

CA 2357276 3/2002
CN 112169762 5/2021

(Continued)

*Primary Examiner* — Frank M Lawrence, Jr.
(74) *Attorney, Agent, or Firm* — Robert A. Diaz

(57) ABSTRACT

Adsorbent material for use in pressure swing adsorption (PSA) related processing can provide improved purification processing with reduced temperature differentials between adsorption and desorption processing of the bed of adsorbent material. Embodiments can be configured so that adsorbent material has occluded micropores or macropores. The occlusion of the micropores or macropores can be up to 42% of the micropores the adsorbent material in some embodiments. At least one metal acetate can be utilized for the occlusion of the micropores or macropores. Utilization of the adsorbent material having occluded micropores or macropores was surprisingly found to increase the yield for purification of a product gas in spite of the occlusion of the micropores or macropores.

16 Claims, 7 Drawing Sheets

(51) Int. Cl.

| | |
|---|---|
| ***B01D 53/047*** | (2006.01) |
| ***B01J 20/08*** | (2006.01) |
| ***B01J 20/18*** | (2006.01) |
| ***B01J 20/20*** | (2006.01) |
| ***B01J 20/22*** | (2006.01) |
| ***B01J 20/28*** | (2006.01) |
| ***B01J 20/32*** | (2006.01) |

(52) U.S. Cl.

CPC ............... *B01J 20/20* (2013.01); *B01J 20/22* (2013.01); *B01J 20/28052* (2013.01); *B01J 20/28097* (2013.01); *B01J 20/3204* (2013.01); *B01D 2253/102* (2013.01); *B01D 2253/108* (2013.01); *B01D 2253/20* (2013.01); *B01D 2253/25* (2013.01); *B01D 2256/16* (2013.01); *B01D 2257/502* (2013.01); *B01D 2257/504* (2013.01); *B01D 2257/7025* (2013.01); *B01D 2259/40041* (2013.01); *B01D 2259/4067* (2013.01)

(58) Field of Classification Search

CPC .. B01J 20/28097; B01J 20/3204; B01J 20/04; B01J 20/08; B01J 20/103; B01J 20/16; B01J 20/2808; B01J 20/28083; B01J 20/28085; B01J 20/3092; B01J 20/3236; B01D 53/047; B01D 2253/102; B01D 2253/108; B01D 2253/20; B01D 2253/25; B01D 2256/16; B01D 2257/502; B01D 2257/504; B01D 2257/7025; B01D 2259/40041; B01D 2259/4067

USPC ............................ 96/108, 121, 153; 502/400

See application file for complete search history.

(56) References Cited

U.S. PATENT DOCUMENTS

| | | | |
|---|---|---|---|
| 3,430,418 A | 3/1969 | Wagner | |
| 3,564,816 A | 2/1971 | Batta | |
| 3,986,849 A | 10/1976 | Fuderer et al. | |
| 4,026,680 A | 5/1977 | Collins | |
| 4,077,780 A | 3/1978 | Doshi | |
| 4,449,208 A | 5/1984 | Moeckel et al. | |
| 4,472,178 A | 9/1984 | Kumar et al. | |
| 4,541,851 A | 9/1985 | Bosquain et al. | |
| 4,784,672 A | 11/1988 | Sircar | |
| 4,923,843 A | 5/1990 | Saforo et al. | |
| 4,963,519 A | 10/1990 | Okabayashi et al. | |
| 4,971,605 A | 11/1990 | Tarman | |
| 5,137,548 A | 8/1992 | Grenier et al. | |
| 5,232,474 A | 8/1993 | Jain | |
| 5,344,626 A * | 9/1994 | Abler | B01J 20/20<br>502/185 |
| 5,425,240 A | 6/1995 | Jain | |
| 5,759,242 A | 6/1998 | Smolarek et al. | |
| 5,846,295 A | 12/1998 | Kalbassi et al. | |
| 5,855,650 A | 1/1999 | Kalbassi et al. | |
| 5,917,136 A | 6/1999 | Gaffney et al. | |
| 6,027,549 A | 2/2000 | Golden et al. | |
| 6,086,659 A | 7/2000 | Tentarelli | |
| 6,106,593 A | 8/2000 | Golden et al. | |
| 6,152,991 A | 11/2000 | Ackley | |
| 6,393,483 B1 | 5/2002 | Latif et al. | |
| 6,402,813 B2 | 6/2002 | Monereau et al. | |
| 6,506,236 B2 | 1/2003 | Golden et al. | |
| 6,565,627 B1 | 5/2003 | Golden et al. | |
| 6,599,347 B2 | 7/2003 | Kalbassi et al. | |
| 6,814,787 B2 | 11/2004 | Golden et al. | |
| 6,866,075 B2 | 3/2005 | Whitley et al. | |
| 7,022,159 B2 | 4/2006 | Kalbassi et al. | |
| 7,285,154 B2 | 10/2007 | Karwacki, Jr et al. | |
| 7,404,846 B2 | 7/2008 | Golden et al. | |
| 7,413,595 B2 | 8/2008 | Schmidt et al. | |
| 7,537,742 B2 | 5/2009 | Baksh et al. | |
| 7,591,992 B2 | 9/2009 | Peng et al. | |
| 8,197,580 B2 | 6/2012 | Hufton et al. | |
| 8,206,669 B2 | 6/2012 | Schaffer et al. | |
| 8,262,783 B2 | 9/2012 | Stoner et al. | |
| 8,268,044 B2 | 9/2012 | Wright et al. | |
| 8,404,024 B2 | 3/2013 | Henderson et al. | |
| 8,518,356 B2 | 8/2013 | Schaffer et al. | |
| 8,535,414 B2 | 9/2013 | Johnson et al. | |
| 8,574,346 B2 | 11/2013 | Monereau et al. | |
| 8,734,571 B2 | 5/2014 | Golden et al. | |
| 8,752,390 B2 | 6/2014 | Wright et al. | |
| 8,795,411 B2 | 8/2014 | Hufton et al. | |
| 8,814,985 B2 | 8/2014 | Gerds et al. | |
| 8,940,263 B2 | 1/2015 | Golden et al. | |
| 9,108,145 B2 | 8/2015 | Kalbassi et al. | |
| 9,199,190 B2 | 12/2015 | Malik et al. | |
| 9,314,768 B2 | 4/2016 | Gueret et al. | |
| 9,631,864 B2 | 4/2017 | Chen et al. | |
| 9,731,241 B2 | 8/2017 | Kalbassi et al. | |
| 10,646,816 B2 | 5/2020 | Zheng et al. | |
| 2011/0206581 A1 | 8/2011 | Ackley et al. | |
| 2011/0219950 A1 | 9/2011 | Rodrigues et al. | |
| 2018/0250654 A1 * | 9/2018 | Bai | B01J 20/3007 |
| 2019/0291078 A1 | 9/2019 | Weist, Jr et al. | |
| 2023/0027070 A1 | 1/2023 | Malik et al. | |

FOREIGN PATENT DOCUMENTS

| | | |
|---|---|---|
| EP | 0747118 | 12/1996 |
| EP | 1417995 | 5/2004 |
| JP | 5202845 | 6/2013 |

* cited by examiner

ADSORBENT MATERIAL, ADSORPTION SYSTEM, AND ADSORPTION PROCESS

FIELD

The present innovation relates to adsorbent material, adsorption systems, adsorption processes, adsorbers for purification of hydrogen product streams, and methods of making and using the same.

BACKGROUND

Adsorbers typically come in four different common configurations: vertical, vertical cross flow, horizontal, and radial. Examples adsorbers, adsorption systems, and adsorbent materials that can be utilized in adsorbers can be appreciated from the disclosures of U.S. Pat. Nos. 3,176,444, 3,252,268, 3,430,418, 3,564,816, 3,986,849, 4,026,680, 4,077,780, 4,449,208, 4,472,178, 4,541,851, 4,784,672, 4,923,843, 4,963,519, 4,971,605, 5,137,548, 5,232,474, 5,425,240, 5,759,242, 5,846,295, 5,855,650, 5,917,136, 6,027,544, 6,086,659, 6,106,593, 6,152,991, 6,402,813, 6,506,236, 6,599,347, 6,814,787, 6,866,075, 6,893,483, 7,022,159, 7,285,154, 7,404,846, 7,413,595, 7,537,742, 7,591,992, 8,197,580, 8,206,669, 8,262,783, 8,268,044, 8,404,024, 8,518,356, 8,535,414, 8,574,346, 8,734,571, 8,752,390, 8,795,411, 8,814,985, 8,940,263, 9,108,145, 9,199,190, 9,631,864, 9,731,241, 10,646,816, U.S. Pat. App. Pub. Nos. 2011/0206581, 2011/0219950, 2019/0291078 and 2023/0027070, Canadian Patent Publication No. 2,357,276 A, Chinese Patent Publication No. CN112169762A and European Patent Publication No. EP 1 417 995 A1.

Thermal Swing Adsorption (TSA), Vacuum Swing Adsorption (VSA), Pressure Swing Adsorption (PSA), and Pressure Vacuum Swing Adsorption (PVSA) are adsorbent systems that can be utilized in different types of purification systems. For instance, PSA systems are used for the recovery and purification of gaseous products such as hydrogen.

SUMMARY

In a PSA related system (e.g. PSA system or PVSA system), a feed gas stream is typically passed to an adsorbent bed comprising a number of such beds at an elevated pressure, which is a pressure that is above atmospheric pressure (e.g. 1 atm). Hydrogen purification PSA systems can be used in steam reformer applications, for example, in which carbon dioxide (CO2), carbon monoxide (CO), methane (CH4) and nitrogen (N2) impurities can be selectively adsorbed to produce a high purity hydrogen (H2) stream at a relatively high pressure. We have determined that changes in adsorbent bed temperature that occur during PSA or PVSA processing can have a significant effect on the on the adsorption performance for removing impurities.

Adsorption is an exothermic process so that during a high-pressure feed step a bed heats up, which effectively reduces the adsorption capacity of the bed. Alternatively, desorption is an endothermic process so that during desorption steps (depressurization, purge, evacuation, etc.), the bed cools down which reduces the amount of gas desorbed since the bed temperature has been decreased. The fluctuation in bed temperature can significantly affect the effective bed capacity in at least two ways: (1) it can lower the adsorbate loading during the adsorption step and (2) it can increase the adsorbate loading during the desorption step both of which serve to reduce the working capacity of the bed of adsorbent material.

We also determined that the adiabatic nature of the processing can result in a significant increase in bed size as compared to the same process if it operated in an isothermal mode. The difference in temperature between the highest temperature during adsorption and the lowest temperature during desorption at a given point in the bed of adsorbent material in an industrial adsorber can be quite substantial (e.g., 65° C. or larger than 65° C.).

We determined that a reduction in the temperature swings for the bed of adsorbent material would be helpful. This can be particularly true for PSA and PVSA systems. Reduction of the temperature difference between the highest temperature during adsorption and the lowest temperature during desorption can efficiently increase the working capacity of the bed of adsorbent material to permit the adsorbent material to work more effectively for purification. This improvement can result in reduced sizing for an adsorber as less adsorbent material can be needed for purification (e.g. improved bed productivity by increasing the flow rate of product providable per unit volume of the bed of adsorbent material) and/or can permit higher operational efficiency (product recovery) by reducing product lost during blowdown, purge, and/or evacuation of the adsorber vessel during regeneration, or desorption, steps.

We also determined that the adsorbent material utilized for improving adsorbent material performance for use in PSA related systems (e.g. PSA systems, PVSA systems, etc.) would preferably avoid requiring use of unique vessel internal structures (or at least limit their use) for trying to limit the temperature difference between the temperature of the bed of adsorbent material during adsorption and the temperature of the bed of adsorbent material during regeneration, or desorption. Use of such internal structures can add structural complexity to adsorber vessel designs that can increase their capital costs. In some cases, such internal structures can also make layering of the adsorbent material more complex and time consuming.

Also, we have determined that adsorbent material that can be used to improve adsorbent material performance and also limit the temperature difference between the temperature of the bed of adsorbent material during adsorption and the temperature of the bed of adsorbent material during regeneration, or desorption, can avoid having to use phase change materials, which can liquefy during a phase change and may move out of the adsorbent material over time, which can substantially reduce the material's adsorption capacity resulting in a loss in productivity and product recovery.

We have developed embodiments of adsorbent material, adsorption systems, PSA systems, and processes of making and using the same that can permit adsorption to occur with a significantly lower difference between the temperature of the bed of adsorbent material during adsorption and the temperature of the bed of adsorbent material during regeneration, or desorption. In some embodiments, the bed of adsorbent material can be provided for use in PSA systems and/or PSA adsorbers so there is temperature reduced temperature difference between adsorption and desorption processing. Embodiments can also be provided so that regeneration cycles for the adsorbent beds may also occur less frequently. Such improvements can provide adsorbent beds that can provide improved adsorption capacity and/or improved operational capacity that can reduce cycle times and bed sizes. The smaller bed can lead to higher productivity and higher product recovery. Such embodiments can provide increased operational flexibility and improved purification processing.

Some embodiments can utilize a bed of adsorbent material and/or at least one layer of adsorbent material within the bed that is solid particulate material that includes a minor portion of the micropores or macropores that are occluded (e.g. micropores, mesopores, or macropores that are either partially blocked or fully blocked so fluid is not passable into the micropores, mesopores, or macropores can be occluded). This minor portion can be less than 42% of the micropores or macropores of the adsorbent material on a volume basis and also greater than 8% of the micropores or macropores on a volume basis in some embodiments. The minor portion can also, or alternatively, be 20% or less than 20% of the micropores or macropores of the adsorbent material on a volume basis, be between 41.7% and 8.3% of the micropores or macropores of the adsorbent material on a volume basis, or be another suitable portion for the minor portion that is less than 50% of the micropores or macropores of the adsorbent material on a volume basis. We have surprisingly found that such material with occluded micropores or occluded macropores can provide improved adsorption and yield even though the overall adsorption capacity is reduced via the occlusions of the micropores and/or macropores. The occlusions also help facilitate a greater heat capacity for the adsorbent material so that the temperature difference of the bed of adsorbent material between the temperature of the bed during adsorption and desorption can be reduced.

In a first aspect, an adsorber for an adsorption system can include a vessel positionable to receive a fluid to purify the fluid. The vessel can have a bed of adsorbent material. The bed of adsorbent material can include a first layer of adsorbent material having a minor portion of micropores occluded with at least one salt consisting of a metal cation and an anion comprised of carbon (C), hydrogen (H), and oxygen (O), a minor portion of macropores occluded with the at least one salt, a minor portion of mesopores and macropores occluded with the at least one salt, or a minor portion of the micropores, mesopores, and macropores occluded with the at least one salt.

In a second aspect, the at least one salt can be at least one metal acetate and the first layer of adsorbent material can have the minor portion of micropores occluded with the at least one metal acetate. The minor portion of micropores occluded with the at least one metal acetate can be less than 42% of the micropores of the adsorbent material of the first layer of adsorbent material being occluded and greater than 8% of the micropores of the adsorbent material of the first layer of adsorbent material being occluded (e.g. between 42% of the volume of the micropores and 8% of the volume of the micropores are occluded or between 42% and 8% of the micropores on a volume basis are occluded). The at least one metal acetate can be potassium acetate or barium acetate in some embodiments.

In a third aspect, the at least one salt can be at least one metal acetate and the first layer of adsorbent material can have the minor portion of macropores occluded with the at least one metal acetate. The minor portion of macropores occluded with the at least one metal acetate can be less than 20% of the macropores of the adsorbent material of the first layer of adsorbent material being occluded on a volume basis and greater than or equal to 2% of the macropores of the adsorbent material of the first layer of adsorbent material being occluded on a volume basis. The at least one metal acetate can be potassium acetate or barium acetate in some embodiments.

In a fourth aspect, the at least one salt can be at least one metal acetate and the first layer of adsorbent material can have the minor portion of micropores occluded with the at least one metal acetate wherein the minor portion of micropores occluded with the at least one metal acetate is less than 42% of the micropores of the adsorbent material of the first layer of adsorbent material being occluded on a volume basis and greater than or equal to 3% of the micropores of the adsorbent material of the first layer of adsorbent material being occluded on a volume basis.

In a fifth aspect, the at least one salt can be at least one metal acetate and the first layer of adsorbent material that can have the minor portion of macropores occluded with the at least one metal acetate, wherein the minor portion of macropores occluded with the at least one metal acetate is less than 15% of the macropores of the adsorbent material of the first layer of adsorbent material being occluded on a volume basis and greater than or equal to 3% of the macropores of the adsorbent material of the first layer of adsorbent material being occluded on a volume basis.

In a sixth aspect, the minor portion that is occluded is between 0.03 cc/g of the micropores being occluded and 0.15 cc/g of the micropores being occluded. The minor portion can also include partial occlusion of macropores and/or mesopores in some embodiments.

In a seventh aspect, the bed of adsorbent material can also include one or more other layers. For example, the bed of adsorbent material can also include a second layer of adsorbent material. The second layer can be upstream of the first layer or downstream of the first layer. In yet other embodiments, there can be at least one second layer that is upstream of the first layer and at least one third layer that is downstream of the first layer.

In an eighth aspect, the adsorber of the first aspect can include one or more features of any of the second aspect, third aspect, fourth aspect, fifth aspect, sixth aspect, and/or seventh aspect. Embodiments can therefore include other features and other combinations of features. Examples of combinations of features can be appreciated from the exemplary embodiments discussed herein, for instance.

In a ninth aspect, a pressure swing adsorption system is provided. The system can include a vessel positionable to receive a fluid to purify the fluid. The vessel can have a bed of adsorbent material. The bed of adsorbent material can include a first layer of adsorbent material having a minor portion of micropores occluded with at least one salt consisting of a metal cation and an anion comprised of carbon (C), hydrogen (H), and oxygen (O), a minor portion of macropores occluded with the at least one salt, a minor portion of mesopores and macropores occluded with the at least one salt, or a minor portion of the micropores, mesopores, and macropores occluded with the at least one salt.

In a tenth aspect, the at least one salt is at least one metal acetate and the first layer of adsorbent material has the minor portion of micropores occluded with the at least one metal acetate wherein the minor portion of micropores occluded with the at least one metal acetate is less than 42% of the micropores of the adsorbent material of the first layer of adsorbent material being occluded on a volume basis and greater than 8% of the micropores of the adsorbent material of the first layer of adsorbent material being occluded on a volume basis. The at least one metal acetate can be potassium acetate or barium acetate in some embodiments.

In an eleventh aspect, the at least one salt is at least one metal acetate and the first layer of adsorbent material can have the minor portion of macropores occluded with the at least one metal acetate wherein the minor portion of macropores occluded with the at least one metal acetate is less than 20% of the macropores of the adsorbent material of the first layer of adsorbent material being occluded on a volume basis and greater than or equal to 2% of the macropores of the adsorbent material of the first layer of adsorbent material being occluded on a volume basis. The at least one metal acetate can be potassium acetate or barium acetate in some embodiments.

In a twelfth aspect, the system of the ninth aspect can include one or more other features. For instance, the system of the ninth aspect can include one or more features of the tenth aspect and/or the eleventh aspect. Embodiments can therefore include other features and other combinations of features. Examples of combinations of features can be appreciated from the exemplary embodiments discussed herein, for instance.

In a thirteenth aspect, a process for making adsorbent material for adsorption processing is provided. Embodiments of the process can include exposing a solid particulate adsorbent material to a first salt solution for a pre-selected period of time for occlusion of a minor portion of micropores of the adsorbent material with at least one salt of the first salt solution. The at least one salt of the first salt solution can include at least one salt consisting of a metal cation and an anion comprised of carbon (C), hydrogen (H), and oxygen (O). The process can also include drying the adsorbent material.

In a fourteenth aspect, the minor portion of micropores of the adsorbent material that is occluded with the at least one salt of the first salt solution can be within a particular minor portion range of occlusions. For example, less than or equal to 20% of the micropores of the adsorbent material being occluded on a volume basis and greater than or equal to 2% of the micropores of the adsorbent material being occluded on a volume basis. As another example, less than 42% of the micropores can be occluded on a volume basis and greater than 8% of the micropores can be occluded on a volume basis.

In a fifteenth aspect, the process can include additional steps. For instance, the process can include removing the solid particulate adsorbent material from the salt solution. In other embodiments, the solid particulate adsorbent material can be utilized in incipient wetness processing such that all the solution exposed to the adsorbent material can enter the material and there may not be a need to remove the particulate adsorbent material from the salt solution.

In a sixteenth aspect, the first salt solution can be a first metal acetate solution and the at least one salt of the first salt solution can includes a first metal acetate. The process can also include exposing the solid particulate adsorbent material to a second salt solution comprising a second metal acetate for a pre-selected period of time for occlusion of a minor portion of micropores of the adsorbent material with the second metal acetate and heating the adsorbent material after the adsorbent material was exposed to the first salt solution and the second salt solution to convert the first metal acetate to a first metal carbonate and to convert the second metal acetate to a second metal carbonate. The process can also include washing the adsorbent material to remove the first metal carbonate from the adsorbent material and facilitate positioning of the second metal carbonate in a minor portion of macropores of the adsorbent material.

The minor portion of macropores of the adsorbent material that is occluded with the second metal acetate can be less than or equal to 20% of the macropores of the adsorbent material being occluded on a volume basis and greater than or equal to 2% of the macropores of the adsorbent material being occluded on a volume basis in some embodiments.

Some embodiments of the process can also include removing the adsorbent material from the second salt solution. In other embodiments, the solid particulate adsorbent material can be utilized in incipient wetness processing such that all the second salt solution exposed to the adsorbent material can enter the material and there may not be a need to remove the particulate adsorbent material from the second salt solution.

In some embodiments, the washing can be performed with water and the first metal carbonate is water soluble and the second metal carbonate is water insoluble.

In some embodiments, the first metal acetate can be potassium acetate, the first metal carbonate can be potassium carbonate, the second metal acetate can be barium acetate and the second metal carbonate can be barium carbonate.

In a seventeenth aspect, the process of the thirteenth aspect can include one or more other features. For instance, the process of the thirteenth aspect can include one or more features of the fourteenth aspect, fifteenth aspect, and/or the sixteenth aspect. Embodiments can therefore include other features and other combinations of features. Examples of combinations of features can be appreciated from the exemplary embodiments discussed herein, for instance.

Other details, objects, and advantages of our adsorbent material, adsorbers, adsorption systems, adsorption processing, and methods of making and using the same will become apparent as the following description of certain exemplary embodiments thereof proceeds.

BRIEF DESCRIPTION OF THE DRAWINGS

Exemplary embodiments of adsorbent material, adsorbers, adsorption systems, adsorption processing, and methods of making and using the same are shown in the drawings included herewith. It should be understood that like reference characters used in the drawings may identify like components.

DETAILED DESCRIPTION OF EXEMPLARY EMBODIMENTS

Figure 1:
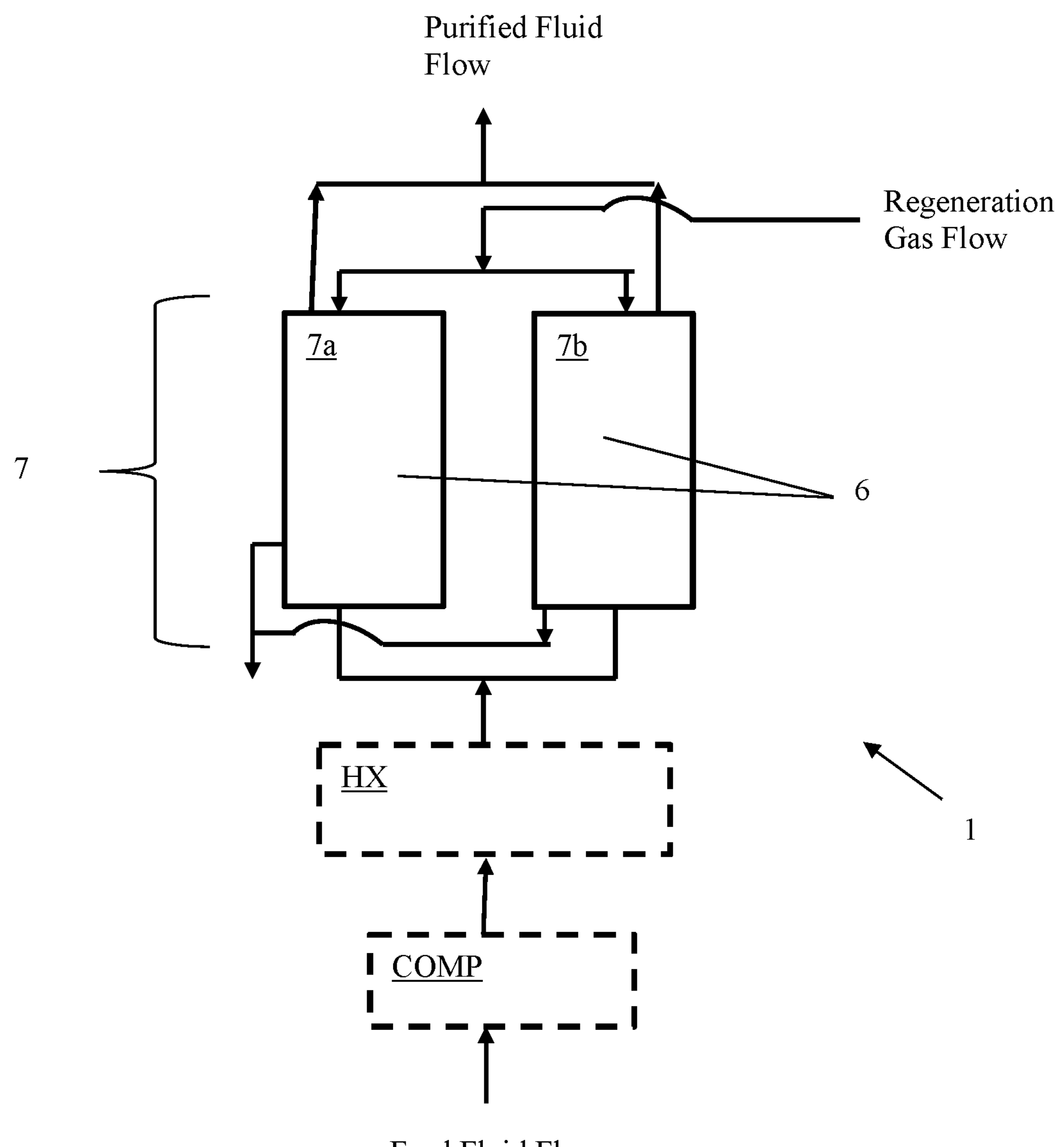
FIG. 1 is a block diagram of a first exemplary embodiment of an adsorption system.
Figure 2:
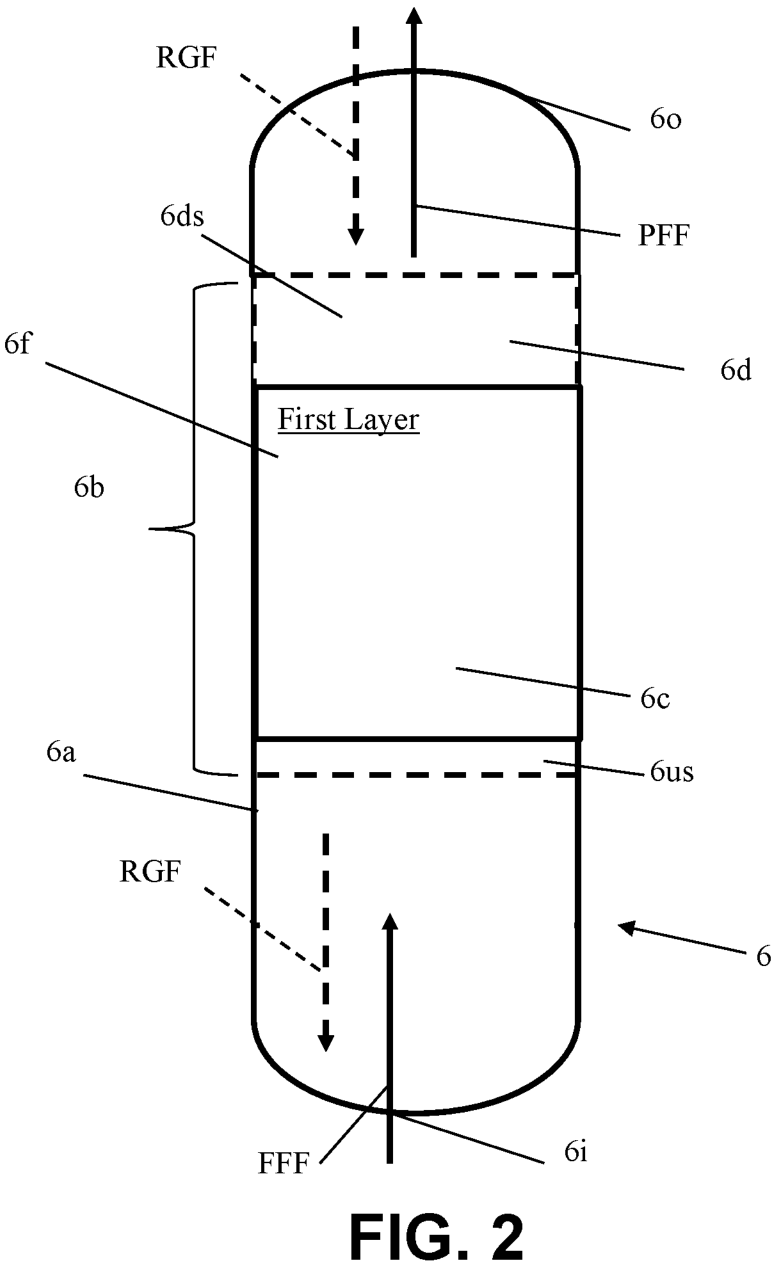
FIG. 2 is a schematic diagram of a first exemplary embodiment of an adsorber that can be utilized in the first exemplary embodiment of the adsorption system.

Referring to FIGS. 1 and 2, an exemplary embodiment of an adsorption system 1 can include a set 7 of multiple adsorbers 6. Each adsorber 6 of the adsorption system 1 can include a bed 6*b* of adsorbent material within a vessel 6*a* of the adsorber 6. The bed 6*b* of adsorbent material can include one or more layers of adsorbent material that can remove multiple target elements from a compressed feed that is to be fed to the adsorber for purification via adsorption (e.g., exposure to adsorbent material that can include one or more layers of adsorbent material). The adsorbers 6 of the adsorption system 1 can include a first adsorber 7*a* and a second adsorber 7*b*. The first and second adsorbers 7*a* and 7*b* can each be configured as a vertical adsorber, a horizontal adsorber or other type of adsorber (e.g., a vertical cross flow adsorber or a radial adsorber, etc.). In some arrangements, the adsorbers can be configured such that the feed flow comes in from the bottom of the adsorber vessel and the output flow is output out the top of the vessel, or such that the feed flow comes in from the top of the vessel and the output flow is passed out of the bottom of the vessel.

Embodiments of the adsorption system 1 can include a set 7 of multiple adsorbers 6 that includes more than two adsorbers 6. For instance, a set 7 of multiple adsorbers can include ten adsorbers 6, between two adsorbers and twelve adsorbers, or include between four adsorbers and twenty adsorbers 6.

The arrangement of adsorbers 6 can be configured to utilize a pressure swing adsorption (PSA) process such as a PSA process or a vacuum PSA (VPSA) process. FIG. 2 illustrates an exemplary embodiment of an adsorber 6 that can be utilized in the system.

The first and second adsorbers 7*a* and 7*b* can be arranged so that they operate in parallel such that when the first adsorber 7*a* is on-stream carrying out purification processes by adsorbing target materials from the fluid fed to the adsorption system 1, the second adsorber 7*b* can be off-stream so that it can undergo desorption via a regeneration gas flow for regeneration of the bed 6*b* of adsorbent material of the off-stream second adsorber 7*b*. When in an off-stream state, the second adsorber 7*b* may not receive fluid for purification of the fluid. Instead, the off-stream state adsorber can receive a regeneration gas flow (RGF) for facilitating desorption of the adsorbent material of the bed 6*b* of adsorbent material to regenerate the adsorbent material.

When the second adsorber 7*b* is on-stream carrying out purification processes by adsorbing target materials from the feed fluid flow (FFF) to form a purified fluid flow (PFF), the first adsorber 7*a* can be off-stream so it can undergo desorption, or regeneration, for regeneration of the bed 6*b* of adsorbent material of the adsorber 6. When in an off-stream state, the first adsorber 7*a* may not receive fluid for purification of the fluid. Instead, the off-stream state adsorber can undergo a reduction in pressure and/or also receive a regeneration gas flow (RGF) for facilitating desorption of the adsorbent material of the bed 6*b* of adsorbent material to regenerate the adsorbent material.

A regeneration gas flow can be fed to the off-stream state adsorber(s), after reducing pressure of the adsorber, to regenerate the adsorbent material of the adsorber so that the impurities adsorbed in the adsorbent material are released and output from the adsorber 6 via the regeneration gas. The output regeneration gas can be emitted to atmosphere or otherwise treated.

It should be appreciated that when an adsorber 6 is in an off-stream state, it can undergo a regeneration process, or desorption process, to regenerate the one or more layers of adsorbent material within the adsorber. When returned to the on-stream state, the adsorber can operate with improved efficiency due to the regeneration of the adsorbent material as the regeneration of the material can return that material to a condition that is close to or at its original state for adsorption of target material from a feed fluid flow.

FIG. 2 illustrates an example of how a feed fluid flow can be passed into the vessel 6*a* of the adsorber 6 as an inlet feed fluid flow (FFF) for being passed into contact with the bed 6*b* of adsorbent material for purification. The purified fluid can then be output as a purified fluid flow PFF via an outlet 60 of the adsorber 6. An example of the use of a regeneration gas flow (RGF) and how it can flow in an opposite direction may also be best appreciated from FIG. 2.

In some embodiments, the adsorption system 1 can include a compressor (COMP) for increasing the pressure of the feed fluid flow (FFF) for feeding to one or more on-state adsorbers for forming the purified feed flow (PFF) with impurities removed from the feed fluid flow. Embodiments can also include a heat exchanger (HX) positioned between the compressor (COMP) and one or more adsorbers 6 for heating or cooling the compressed purified feed flow to a pre-selected adsorber feed temperature for feeding to the adsorber(s) 6 in the on-stream state of the adsorption system for undergoing purification therein.

In other embodiments, the compressor and/or heat exchanger upstream of the adsorbers may not be needed or used. For example, in some implementations, the fluid to be fed to the one or more on-state adsorbers of the adsorption system can be output from an upstream device (e.g., reactor, separation vessel, knockout tank, etc.) at a suitable pressure and/or temperature for undergoing purification within the adsorber(s) 6.

The adsorption system 1 can be configured so that the input of fluid into the first adsorber 7*a* or second adsorber 7*b* is changed (e.g. via valve position changes, etc.) to switch the parallel adsorbers between their on-stream states and their off-stream states (e.g. when the first adsorber 7*a* is on-stream, the second adsorber 7*b* can be off-stream and vice versa). The regeneration gas flow (RGF) (shown in broken line in FIG. 2) that is passed through the adsorber 6 for regeneration of the adsorbent material can be gas obtained via a product flow output from a column, a product gas tank, or can be gas from another source of a plant or apparatus.

For at least some embodiments, the regeneration gas flow (RGF) can pass through the vessel 6*a* of an absorber 6 along a flow path that is the reverse of the flow path of fluid passed through the vessel of the adsorber when the adsorber is in the on-stream state. For such embodiments, the inlet 6*i* of the vessel 6 through which the feed fluid flow can pass into the vessel 6*a* when the adsorber 6 is in the on-stream state may function as an outlet for the regeneration gas and the outlet 60 of the vessel through which the purified fluid flow can be output during the on-stream state may function as an inlet for the regeneration gas.

Each adsorber 6 (e.g., first adsorber 7*a*, second adsorber 7*b*, etc.) can include a bed 6*b* of adsorbent material retained within a vessel 6*a* that includes one or more layers of adsorbent material. A first layer 6*f* of a first bed 6*c* of adsorbent material can be configured via composition, layer thickness, particle size, pore volume, density, and/or chemical structure (e.g. how cations connect to the zeolite framework), etc. to selectively remove impurities. Some embodiments of the adsorber can have a single bed 6*b* that only includes a single first layer 6*c*.

Other embodiments can utilize a bed 6*b* that has additional layers. For instance, some embodiments can include a second adsorbent layer 6*d* (shown in broken line in FIG. 2)

of the bed 6*b* of adsorbent material can be configured via composition, layer thickness, particle size, pore volume, density, and/or chemical structure (e.g. how cations connect to the zeolite framework), etc. to selectively remove other fluid constituents from the feed fluid passed through the adsorber 6 when it is in the on-stream state. Yet other embodiments can include additional layers (e.g. a third layer downstream of the second layer or a third layer that is upstream of the first layer as shown in broken line in FIG. 2, etc.). Each layer of adsorbent material can include different adsorbent material for removal of a particular set of one or more target impurities.

For example, in some embodiments in which the first layer 6*f* of the bed 6*b* is not the only single layer of the bed 6*b* can also include at least one downstream layer 6*ds* that is downstream of the first layer and at least one upstream layer 6*us* that is upstream of the first layer. The upstream term of the upstream layer 6*us* can refer to the position of that layer relative to the first layer when the bed 6*b* of adsorbent material is in contact with the feed fluid flow (FFF) for adsorption of impurities from the feed to form the purified fluid flow (PFF). Similarly, the downstream term of the downstream layer 6*ds* can refer to the position of that layer relative to the first layer when the bed 6*b* of adsorbent material is in contact with the feed fluid flow (FFF) for adsorption of impurities from the feed to form the purified fluid flow (PFF).

The feed fluid passed through bed 6*b* of adsorbent material of an on-stream adsorber can interact with the adsorbent material so that undesired components of the fluid stream such as nitrogen (N2), water (H2O), carbon dioxide (CO2), carbon monoxide (CO), hydrocarbon components etc. can be completely or partially removed to form a purified fluid flow. The purified fluid can be output from the on-state adsorber(s) as a product gas in some embodiments.

For example, in some embodiments, the feed fluid flow can be a synthetic gas formed via a steam reforming process. The bed 6*b* of adsorbent material can be configured to purify the gas to form a purified fluid flow comprised of hydrogen via PSA (e.g. the purified fluid flow can have a H2 content of between 90 mole percent (mol %) and 100 mol %, etc.).

As another example, the feed fluid flow can be a partial oxidation (POX) gas stream that has a high level of carbon dioxide (CO2) content and the bed 6*b* of adsorbent material can be configured to purify the gas to form a purified fluid flow comprised of H2 via PSA (e.g. the purified fluid flow can have a H2 content of between 90 mol % and 100 mol %, etc.).

As yet another example, the feed fluid flow can be a refinery off gas that can include a mixture of H2 and various hydrocarbons. The high level of hydrocarbons in the feed fluid flow can result in significant temperature swings during PSA processing to produce an H2 product. As discussed herein, embodiments can be configured so that such temperature swings are decreased significantly and can provide improved product recovery and other improvements.

FIG. 2 illustrates an example of how a fluid flow can be passed into the vessel 6*a* of the adsorber 6 as an inlet fluid flow feed (FFF) for being passed into contact with a first layer 6*c* of adsorbent material within the bed 6*b* of adsorbent material. The purified fluid can then be output as a purified fluid flow (PFF) via an outlet 60 of the adsorber 6.

As noted above, in some embodiments the adsorber 6 can have a bed of adsorbent material that can include one or more additional layers of material downstream of the first layer 6*c* of adsorbent material and/or upstream of the first layer 6*c*. For instance, the fluid flow feed can pass from the first layer 6*c* and through the second layer 6*d* downstream of the first layer 6*c* in some embodiments. In other embodiments, the bed of adsorbent material can include at least one upstream layer positioned upstream of the first layer so that the feed fluid flow passes through the upstream layer(s) before passing through the first layer 6*c* during adsorption processing for purification of the feed fluid flow. The bed of adsorbent material can include one or more downstream layers downstream of the first layer in such an embodiment or the first layer can be the most downstream layer of the bed of adsorbent material. In yet other embodiments, the adsorber 6 can only have a bed of adsorbent material that includes the single layer of material as a single first layer 6*c* of adsorbent material.

The adsorbent material of the first layer 6*f* of the bed 6*b* of adsorbent material can include solid particulate adsorbent material that is loaded with a salt that includes a metal cation and an anion comprised of carbon (C), hydrogen (H), and oxygen (O) to occlude a minor portion of the pores of the adsorbent material. In some embodiments, the salt can consist of a metal cation and an anion comprised of carbon (C), hydrogen (H), and oxygen (O) to occlude a minor portion of the pores of the adsorbent material.

The pores that are occluded can include the micropores in some embodiments. In other embodiments, the pores that are occluded can be the macropores or mesopores. In yet other embodiments, pores of the material that are occluded can include micropores, mesopores and macropores. The minor portion of the pores that are occluded can be between 2% and 20% of the pores on a volume basis, can be between 2% and 15% of the pores on a volume basis, or can be another suitable percentage range of the pores (e.g. between 8% and 42% of the pores of the adsorbent material on a volume basis, between 2% and 10% of the pores of the adsorbent material on a volume basis, etc.). Examples of the salts that can be loaded onto the adsorbent material for occlusion of the pores (e.g. micropores, macropores, and/or other intermediate sized pores, etc.) can include, for example, a metal acetate (e.g. potassium acetate, barium acetate, sodium acetate, lithium acetate, etc.), a metal carbonate (e.g. barium carbonate, sodium bicarbonate, etc.), a metal nitrate (e.g. barium nitrate, Ba(NO3)2, etc.), a metal chloride (e.g. barium chloride, BaCl2, etc.), a metal benzoate (e.g. sodium benzoate, C7H5NaO2), a metal formate (e.g. barium formate, C2H2BaO4, etc.) and/or a metal tartrate (e.g. potassium tartrate, C4H4K2O6, etc.). A mixture of two or more of these salts can be utilized for loading the adsorbent material for occlusion of its pores or only a single one of these salts can be utilized for the loading of the adsorbent material for pore occlusion.

For example, the adsorbent material of the first layer 6*c* of the bed 6*b* of adsorbent material can include solid particulate adsorbent material that is loaded with a metal acetate to occlude a minor portion of the micropores or macropores of the adsorbent material. For example, the solid particulate adsorbent material can include adsorbent material that has between 3% and 20% of its micropores occluded with a metal acetate. As another example, the solid particulate adsorbent material can include adsorbent material that has between 3% and 20% of its macropores occluded with a metal acetate.

A micropore of adsorbent material can refer to a pore within a solid particulate of the adsorbent material that has a width that is no more than 2 nanometers (nm) in size, which is 20 angstroms (e.g. the micropore width is less than or equal to 2 nm and is greater than 0 nm). A macropore of adsorbent material can refer to a pore within a solid particulate of the adsorbent material that has a width that is greater than 50 nanometers (nm) in size. A macropore is larger than a micropore. A mesopore can also be larger than a micropore and can be smaller than a macropore. A mesopore of the adsorbent material can refer to a pore that has a width that is greater than 2 nm and is less than 50 nm in size.

Examples of solid particulate adsorbent material that can have salt occlusion of a minor portion of its micropores, mesopores, and/or macropores (e.g. less than or equal to 20% of the micropores being occluded on a volume basis or less than or equal to 20% of the macropores being occluded on a volume basis, less than or equal to 20% of its pores being occluded on a volume basis, etc.) where the salt includes a metal cation and an anion that includes C, H, and O (e.g. metal acetate, etc. as noted above) can include activated carbon, zeolites, silica, activated alumina, and metal-organic framework (MOF) material. The MOF material can include a hybrid inorganic-organic porous material that includes a metal-oxygen cluster and organic molecules.

For instance, some embodiments of the adsorbent material within the bed 6*b* of adsorbent material can include activated carbon having between 2% and 20% of its micropores (on a volume basis) occluded with a metal acetate, a zeolite having between 2% and 20% of its micropores (on a volume basis) occluded with a metal acetate, silica having between 2% and 20% of its micropores (on a volume basis) occluded with a metal acetate, activated alumina having between 2% and 20% of its micropores occluded (on a volume basis) with a metal acetate, and/or an MOF having between 2% and 20% of its micropores occluded (on a volume basis) with a metal acetate. As another example, some embodiments of the adsorbent material within the bed 6*b* of adsorbent material can include activated carbon having between 2% and 20% of its macropores occluded (on a volume basis) with a metal acetate, a zeolite having between 2% and 20% of its macropores occluded (on a volume basis) with a metal acetate, silica having between 2% and 20% of its macropores occluded (on a volume basis) with a metal acetate, activated alumina having between 2% and 20% of its macropores occluded (on a volume basis) with a metal acetate, and/or an MOF having between 2% and 20% of its macropores occluded (on a volume basis) with a metal acetate. As yet another example, some embodiments of the adsorbent material within the bed 6*b* of adsorbent material can include activated carbon having between 2% and 20% of its mesopores and macropores occluded with a metal acetate, a zeolite having between 2% and 20% of its mesopores and macropores occluded with a metal acetate, silica having between 2% and 20% of its mesopores and macropores occluded with a metal acetate, activated alumina having between 2% and 20% of its mesopores and macropores occluded (on a volume basis) with a metal acetate, and/or an MOF having between 2% and 20% of its mesopores and macropores occluded (on a volume basis) with a metal acetate. In terms of mesopores and macropores being occluded, this can refer to the overall total percent of the combined mesopore and macropore pore volume being occluded on a volume per gram or other type of volume basis (e.g. if there are 40 cc/g mesopores and 60 cc/g macropores, 20 cc/g pores of this group being occluded is 20% of the mesopores and macropores that are occluded on a volume basis and 2 cc/g pores of this group being occluded is 2% of the mesopores and macropores that are occluded on a volume basis).

In other embodiments, the minor portion of the micropores or macropores of the adsorbent material that is occluded with a metal acetate or other type of salt that includes a metal cation and an anion that is comprised of C, H, and O can be between 3% and 15% of the micropores (on a volume basis) or between 3% and 15% of the macropores (on a volume basis). For example, some embodiments of the adsorbent material within the bed 6*b* of adsorbent material can include activated carbon having between 3% and 15% of its micropores occluded (on a volume basis) with a metal acetate, a zeolite having between 3% and 15% of its micropores occluded (on a volume basis) with a metal acetate, silica having between 3% and 15% of its micropores occluded (on a volume basis) with a metal acetate, activated alumina having between 3% and 15% of its micropores occluded (on a volume basis) with a metal acetate, and/or an MOF having between 3% and 15% of its micropores occluded (on a volume basis) with a metal acetate. As another example, some embodiments of the adsorbent material within the bed 6*b* of adsorbent material can include activated carbon having between 3% and 15% of its macropores occluded (on a volume basis) with a metal acetate, a zeolite having between 3% and 15% of its macropores occluded (on a volume basis) with a metal acetate, silica having between 3% and 15% of its macropores occluded (on a volume basis) with a metal acetate, activated alumina having between 3% and 15% of its macropores occluded (on a volume basis) with a metal acetate, and/or an MOF having between 3% and 15% of its macropores occluded (on a volume basis) with a metal acetate. As yet another example, some embodiments of the adsorbent material within the bed 6*b* of adsorbent material can include activated carbon having between 3% and 15% of its mesopores and macropores occluded (on a volume basis) with a metal acetate, a zeolite having between 3% and 15% of its mesopores and macropores occluded with a metal acetate, silica having between 3% and 15% of its mesopores and macropores occluded (on a volume basis) with a metal acetate, activated alumina having between 3% and 15% of its mesopores and macropores occluded (on a volume basis) with a metal acetate, and/or an MOF having between 3% and 15% of its mesopores and macropores occluded (on a volume basis) with a metal acetate. As noted above, in terms of mesopores and macropores being occluded, this can refer to the overall total percent of the combined mesopore and macropore pore volume being occluded (e.g. if there are 60 cc/g mesopores and 40 cc/g macropores, 15 cc/g pores of this group being occluded is 15% of the mesopores and macropores that are occluded on a volume basis and 3 cc/g pores of this group being occluded is 3% of the mesopores and macropores that are occluded on a volume basis, etc.).

In yet other embodiments, the minor portion of the micropores or macropores of the adsorbent material that is occluded (on a volume basis) with a metal acetate can be less than 15% of the micropores and greater than 0.5% of the micropores or less than 15% of the macropores and greater than 0.5% of the macropores. In yet other embodiments, the minor portion of the micropores or macropores of the adsorbent material that is occluded (on a volume basis) with a metal acetate can be less than 15% of the micropores and greater than 0.5% of the micropores or less than 15% of the macropores and greater than 0.5% of the macropores.

In some embodiments, the bed of adsorbent material can include only a single type of such micropore occluded adsorbent material or macropore occluded adsorbent material. In other embodiments, the bed 6*b* of adsorbent material can include a mixture of such materials.

We have found that embodiments of the adsorption system 1 can provide improved hydrogen recovery with reduced temperature swings between the temperature of the bed 6*b* of adsorbent material during adsorption as compared to the temperature of the bed 6*b* of adsorbent material during desorption, or regeneration. Embodiments of the adsorption system 1 can provide improved recovery and/or improved purity of other target purification gas (e.g. CO2) with reduced temperature swings between the temperature of the bed 6*b* of adsorbent material during adsorption as compared to the temperature of the bed 6*b* of adsorbent material during desorption, or regeneration, as well.

Figure 3:
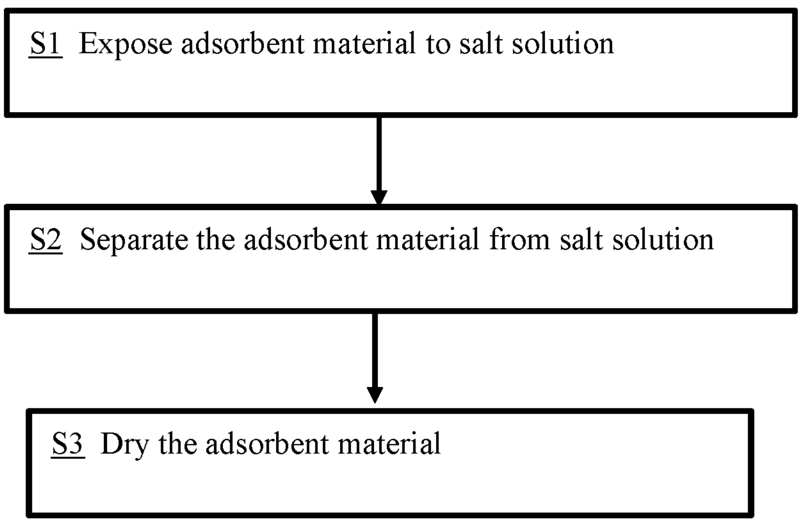
FIG. 3 is a flow chart illustrating an exemplary embodiment of a process for making an exemplary embodiment of the adsorbent material.

The adsorbent material can be treated to be occluded with a metal acetate in different ways. In some embodiments, the micropores or macropores can be occluded with a metal acetate (e.g. CH3CO2K, which can also be referred to as KC2H3O2, or C4H6BaO4, which can also be referred to as Ba(C2H3O2)2, etc.) via incipient wetness impregnation or wet impregnation. FIG. 3 illustrates a first exemplary process for occlusion of a minor portion of the micropores of a solid particulate adsorbent material.

For instance, adsorbent material can be exposed to a salt solution that comprises a metal acetate mixed in water in a first step S1. For example, the adsorbent material can be dried and the dried adsorbent material can be placed within a bath of a salt solution that includes at least one metal acetate. The material exposed to the salt solution can undergo agitation for a pre-selected mixing time period to help facilitate the mixing of the adsorbent material with the solution. In a second step S2, the adsorbent material can then be removed from the solution (e.g. the solution can be drained or the adsorbent material can be within a meshed retainer having mesh sizing to retain the particulate adsorbent material while allowing the liquid salt solution to drain from the retainer that can be removed from a bath or vessel having the salt solution) or otherwise separated from the solution. This second step S2 can be omitted in situations where incipient wetness processing is being utilized as all the solution exposed to the adsorbent material can enter the material.

The adsorbent material can then undergo drying for a pre-selected drying time period after being removed from the salt solution in a third step S3. The drying can be performed while in an inert atmosphere (e.g. being within an argon or nitrogen atmosphere) in some embodiments. The salt solution exposure time period and drying can be configured to facilitate occlusion of the minor portion of the micropores or macropores of the adsorbent material.

After drying the adsorbent material can be stored before being fed to an adsorber vessel to form a bed 6*b* of adsorbent material or at least a layer of a bed 6*b* of adsorbent material. The storage of the adsorbent material can be under an inert gas (e.g. nitrogen or argon, etc.) in some embodiments.

Figure 4:
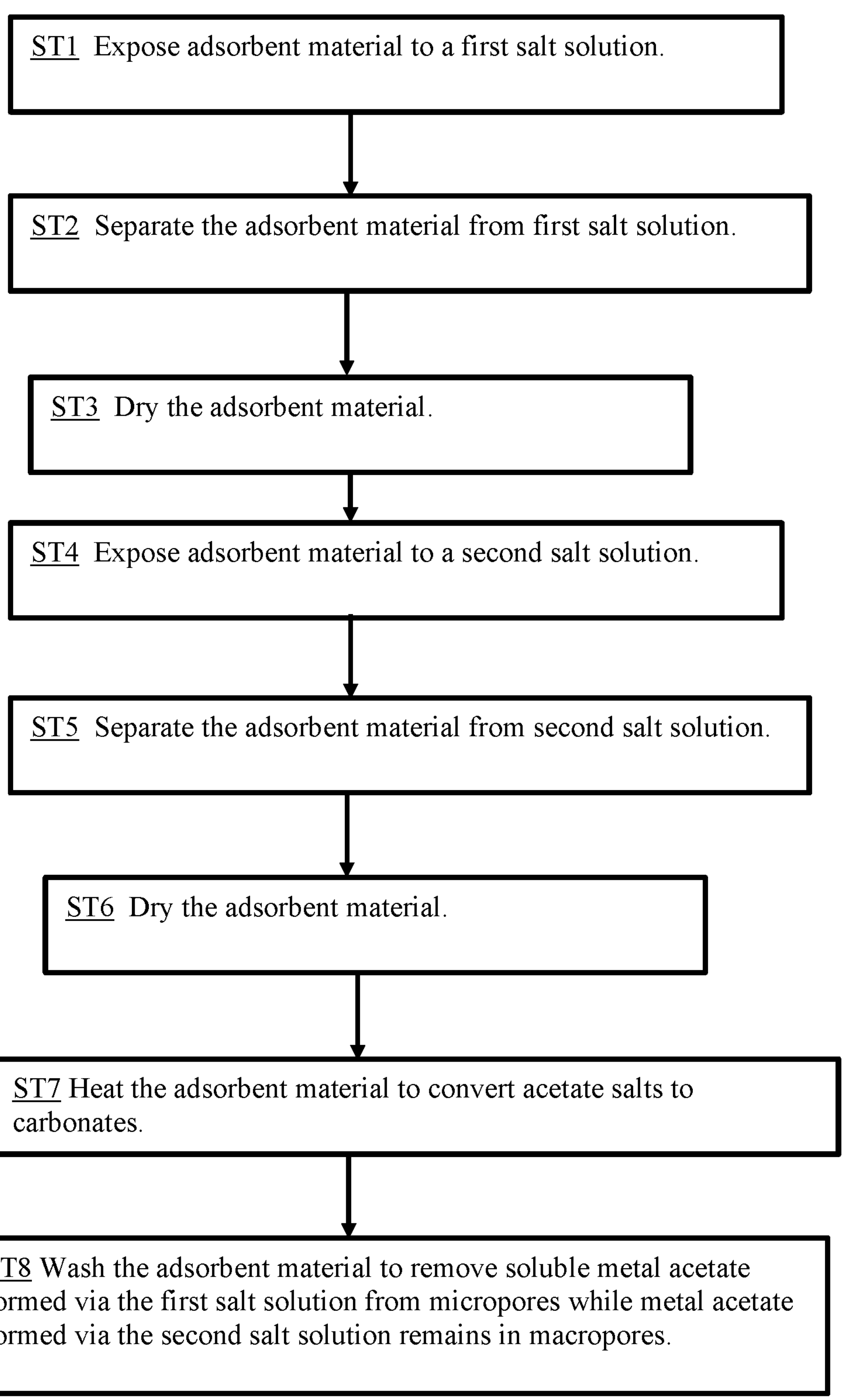
FIG. 4 is a flow chart illustrating another exemplary embodiment of a process for making an exemplary embodiment of the adsorbent material.

FIG. 4 illustrates a second exemplary process for occlusion of a minor portion of the macropores of a solid particulate adsorbent material. In the process of FIG. 4, adsorbent material can be exposed to a first salt solution that comprises a first metal acetate (e.g. potassium acetate) mixed in water in a first step ST1. For example, the adsorbent material can be dried and the dried adsorbent material can be placed within a bath of a salt solution that includes a first metal acetate. This first salt solution can be configured to impregnate a first metal acetate that is water soluble within micropores of the adsorbent material. The adsorbent material can then be separated from the first salt solution in a second step ST2 and dried in a third step ST3. As noted above, the second step ST2 can be omitted in situations where incipient wetness processing is being utilized as all the solution exposed to the adsorbent material can enter the material. The third step ST3 may also not be needed depending on material properties and desired dryness for further processing.

The adsorbent material can then be exposed to a second salt solution in a fourth step ST4. The mixture of the adsorbent material and the second salt solution can undergo agitation for a second pre-selected mixing time period to help facilitate the mixing of the adsorbent material with the solution. In a fifth step ST5, the adsorbent material can then be removed from the second salt solution (e.g. the solution can be drained or the adsorbent material can be within a meshed retainer having mesh sizing to retain the particulate adsorbent material while allowing the liquid salt solution to drain from the retainer that can be removed from a bath or vessel having the salt solution). The fifth step ST5 can be omitted in situations where incipient wetness processing is being utilized as all the solution exposed to the adsorbent material can enter the material. The adsorbent material can undergo drying for a second pre-selected drying time period after being removed from the second salt solution in a sixth step ST6. The drying can be performed while in an inert atmosphere (e.g. being within an argon or nitrogen atmosphere) in some embodiments. The second salt solution exposure time period and drying can be configured to facilitate occlusion of the minor portion of the micropores or macropores of the adsorbent material.

In a seventh step ST7, the adsorbent material can be heated to a pre-selected heated temperature to convert acetate salts to carbonate (e.g. via treatment in heated air or heated CO2). Then, in an eight step ST8, the adsorbent material can be washed with water to remove the water soluble salts from the micropores while water insoluble salts formed via exposure to the second salt solution (e.g. BaCO3) can remain in macropores of the adsorbent material. After the washing, the adsorbent material can undergo drying and subsequently be stored and/or subsequently used in a layer of a bed of adsorbent material.

In some embodiments, the first salt solution can be potassium acetate solution and the second salt solution can be a barium acetate solution so that the adsorbent material can be loaded with 5% potassium acetate and 10% barium acetate or between 3% and 10% potassium acetate and between 8% and 20% barium acetate. After conversion of the acetates to carbonates (e.g. potassium carbonate and barium carbonate) by heating in air or CO2, the water soluble potassium carbonate can be removed via washing performed in the eighth step ST8 and the water insoluble barium carbonate can occlude the macropores of the adsorbent material via the heating and washing in such an embodiment.

It is contemplated that some portion of the micropores can also be occluded in addition to the macropores in some implementations of the exemplary embodiment of the process shown in FIG. 4. In such a situation, a minor portion of the micropores and a minor portion of the macropores can be occluded such that less than 20% of the macropores are occluded on a volume basis and less than 15% of the micropores are occluded on a volume basis (e.g. between 10% and 0% of the micropores are occluded on a volume basis and less than 20% and greater than 0% of the macropores are occluded on a volume basis). Some portion of the mesopores can also be occluded in such an embodiment as well (e.g. less than 20% of the mesopores and more than 0% of the mesopores can be occluded on a volume basis).

The above examples of FIGS. 3 and 4 can utilize an incipient wetness approach or a wet impregnation approach for the metal acetate occlusion of micropores and/or macropores. In a wet impregnation approach, the solid particulate adsorbent material can be added to a significant excess of impregnating solution and then separated. The separated adsorbent material can optionally be washed (if needed) and then be dried.

In an incipient wetness approach, an amount of the salt solution necessary so that all the solution is entered into the adsorbent material can be used. The removal of the solid particulate material from the solution may not be needed or used in such a process as all the utilized solution can be entered into the adsorbent material. The wetted material can undergo drying, however.

Improvement in adsorption functionality that can be provided by adsorbers using at least a layer of adsorbent material having a minor portion of occluded micropores or occluded macropores was also evaluated in conducted experiments and analyses. The conducted evaluations are discussed further below.

EXPERIMENTS

In a first experimental example, a coal-based activated carbon from Kuraray (formerly called Calgon Carbon) was dried at 150° C. for 24 hours. After cooling to room temperature, a portion of that material was selected as a base carbon sample and a second portion was modified to include micropore occlusion with potassium acetate. The modified second portion was modified by the activated carbon being prepared by incipient wetness impregnation for potassium acetate occlusion of a minor portion of the micropores of the activated carbon.

For instance, solutions with different salt concentrations were prepared and added to the activated carbon for modification of the activated carbon. The solution volume was small enough that all of the solution entered the activated carbon. For example, a salt solution consisting of 262 g/l of potassium acetate in water was prepared. An aliquot of 557 μl of the salt solution was added to 1 g of the dried adsorbent and mixed for 5 min. Subsequently, the impregnated activated carbon was dried at 100° C. for 20 hours and stored under argon. The sample contained 0.146 grams of potassium acetate (KC2H3O2) per gram of carbon (0.146 g KC2H3O2/1 g C).

Additional samples containing 0.056 g potassium acetate per gram carbon (0.056 g KC2H3O2/1 g C) and 0.202 gram potassium acetate per gram carbon (0.202 g KC2H3O2/1 g C) were prepared by similar method but with higher salt concentration in the starting salt solution. These samples equated to a potassium acetate loading of the activated carbon of 5.6% (0.056 g KC2H3O2/1 g C), 14.6% (0.146 g KC2H3O2/1 g C), and 20.2% (0.202 g KC2H3O2/1 g C). These listed loading percentages are on a per mass of C basis. The 5.6% loading of potassium acetate equates to a 5.3 weight percent (wt %) of potassium acetate, the 14.6% loading of potassium acetate equates to 12.74 wt % potassium acetate, and 20.2% loading of potassium acetate equates to 16.8 wt % potassium acetate. Acetate loading (%) can be the mass of acetate divided by the mass of carbon. Weight percent (wt %) can be defined as the mass of the acetate divided by the mass of the solid (e.g. the combined mass of the acetate and the carbon).

Figure 5:
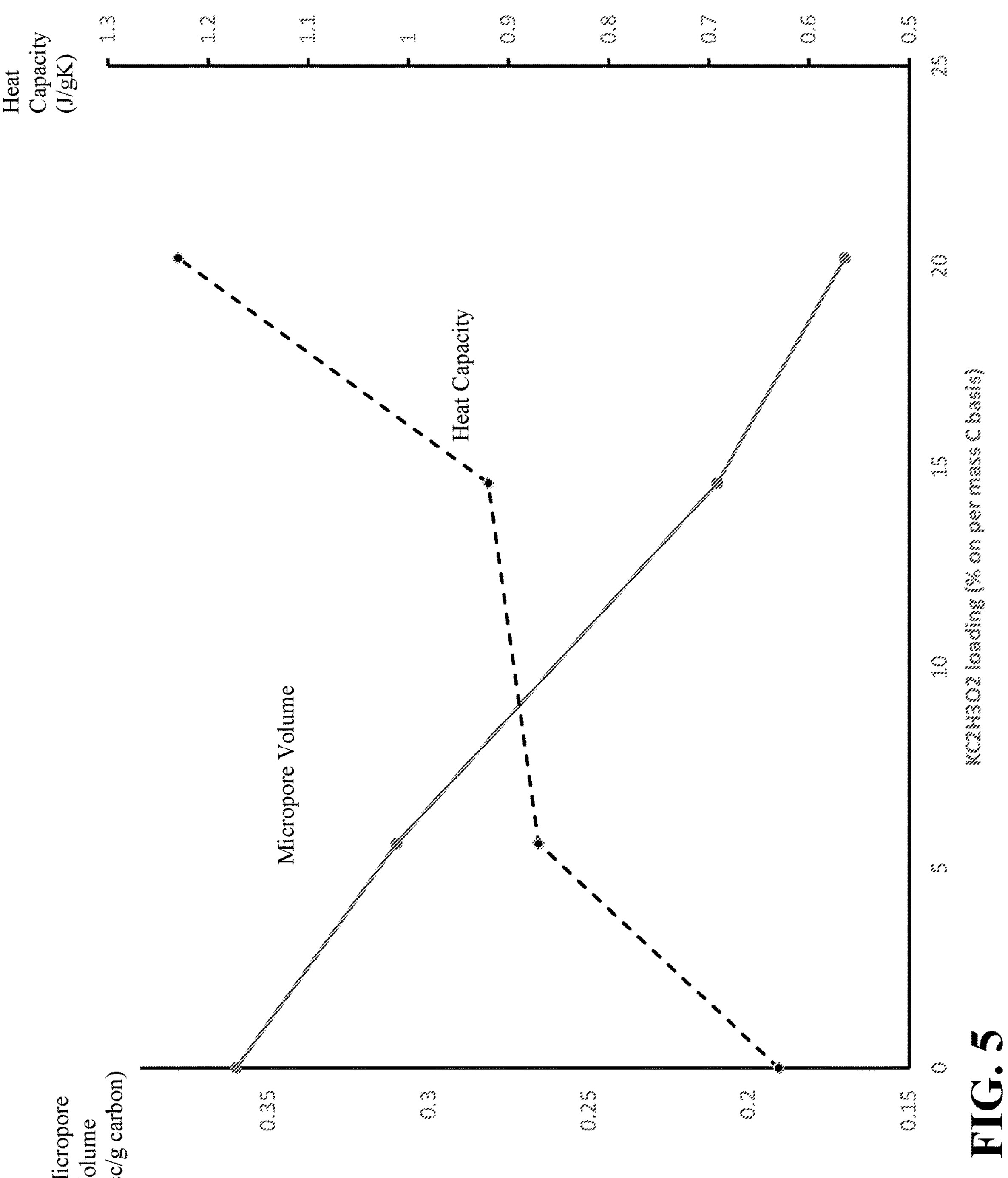
FIG. 5 is a graph illustrating effects potassium acetate loading was found to have on heat capacity and micropore volume for experimentation performed on an exemplary embodiment of adsorbent material that can be included in a bed of adsorbent material in an adsorber of the first exemplary embodiment of the adsorption system.

Differential Scanning calorimetry (DSC) tests were conducted to measure the heat capacity of the base activated carbon and modified adsorbents of the first, second, and third modified samples (e.g. the 0.056 g KC2H3O2/1 g C, 0.146 g KC2H3O2/1 g C, and 0.202 g KC2H3O2/1 g C samples). The heat capacities measured at 40° C. are plotted in FIG. 5. The heat capacities are reported on an activated carbon-only weight basis (e.g. excluding the weight of the salt(s), so units of J/(g carbon)/K). The modified samples having potassium acetate occlusion of micropores of the activated carbon yielded higher heat capacity than the base activated carbon material.

Argon adsorption at 87 K was completed for each sample, and the micropore pore volume was evaluated by quenched solid density functional theory (QSDFT). The results are also potted in FIG. 5, where the data are also provided on a carbon-only basis (units of cubic centimeter (cc) micropore volume/gram (g) of carbon). As can be seen from FIG. 5, the micropore volume decreases as the potassium acetate loading increases.

In a second experimental example, activated carbon samples from Kuraray were impregnated with various levels of barium acetate (Ba(C2H3O2)2)) prepared by analogous method to the above first experimental example using potassium acetate. For instance, a coal-based activated carbon from Kuraray was dried at 150° C. for 24 hours. After cooling to room temperature, a portion of that material was selected as a base carbon sample and a second portion was modified to include micropore occlusion with barium acetate. The modified second portion was modified by the activated carbon being prepared by incipient wetness impregnation for barium acetate occlusion of a minor portion of the micropores of the activated carbon.

For instance, solutions of barium acetate with different salt concentrations were prepared and added to the activated carbon for modification of the activated carbon. The solution volume was small enough that all of the solution entered the activated carbon. Subsequently, the impregnated activated carbon was dried at 100° C. for 20 hours and stored under argon. Samples containing 0.038 g barium acetate per gram carbon (0.038 g Ba(C2H3O2)2)/1 g C), 0.137 g barium acetate per gram carbon (0.137 g Ba(C2H3O2)2)/1 g C), and 0.239 gram barium acetate per gram carbon (0.239 g Ba(C2H3O2)2)/1 g C) were prepared by use of this method. These samples equated to a barium acetate loading of the activated carbon of 3.8% (0.038 g Ba(C2H3O2)2)/1 g C), 13.7% (0.137 g Ba(C2H3O2)2)/1 g C), and 23.94% (0.239 g Ba(C2H3O2)2)/1 g C). These listed loading percentages are on a per mass of carbon basis. The 3.8% loading of barium acetate equates to a 3.7 weight percent (wt %) of barium acetate, the 13.7% loading of barium acetate equates to 12.0 wt % barium acetate, and 23.9% loading of barium acetate equates to 19.3 wt % of barium acetate.

Figure 6:
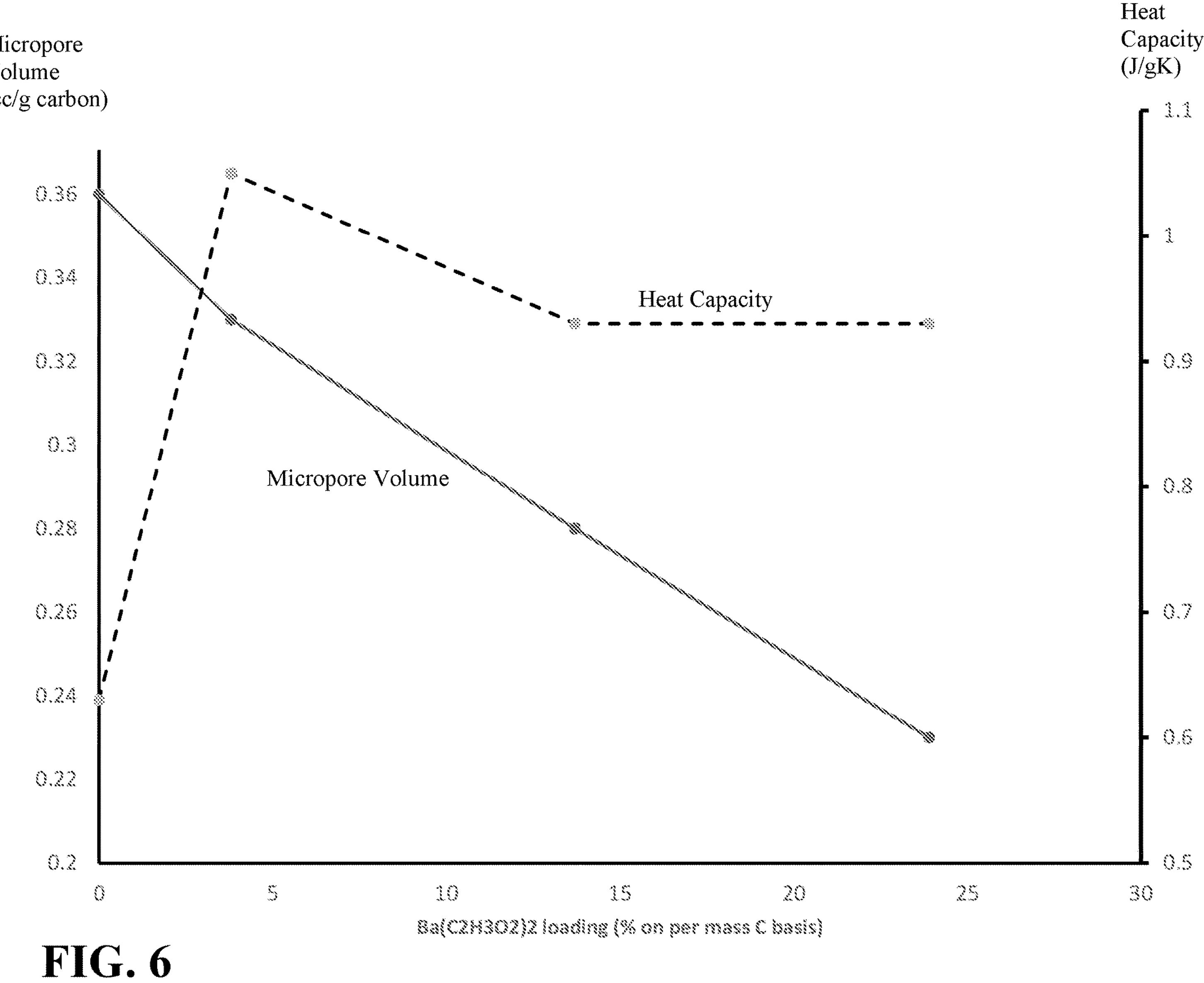
FIG. 6 is a graph illustrating effects barium acetate loading was found to have on heat capacity and micropore volume for experimentation performed on an exemplary embodiment of adsorbent material that can be included in a bed of adsorbent material in an adsorber of the first exemplary embodiment of the adsorption system.

Heat capacities and micropore volumes were measured via DSC and QSDFT as was done in the first experimental example and are plotted in FIG. 6. The heat capacities are reported on a carbon-only basis. Similar trends are observed with salt loading. However, the heat capacity exhibited an unexpected maximum at 0.038 g Ba(C2H3O2)2)/g carbon.

In a third experimental example, an adsorption process simulator was used to evaluate the potential advantages of modified active carbon adsorbents prepared via the first and second experimental examples. Simulations were run for a PSA unit processing a steam reformer synthetic feed gas that includes hydrogen for purification of the hydrogen. A ten bed unit was considered utilizing a process cycle containing 2 beds on feed and 4 pressure equalization steps. The total packed bed length and the feed flow rate were constant amongst the three cases that were simulated-a first case using activated carbon as a base example, a second case using 14.6% potassium acetate impregnated activated carbon that occluded the micropores of the activated carbon (the 0.146 g KC2H3O2/1 g C sample), and a third case using 3.8% barium acetate impregnated activated carbon that occluded the micropores of the activated carbon (the 0.038 $Ba(C2H3O2)2$)/1 g C sample).

In the conducted simulations, the adsorption beds were packed with a first layer of activated carbon (base or modified) and a second layer of commercial 5A zeolite positioned downstream of the first layer of activated carbon. Activated carbon/zeolite layering was selected to yield less than 3000 parts per million (ppm) CO2 at the activated carbon/zeolite interface at the end of the feed step. Equalization valves were adjusted to give 0.1 atm difference between the providing and receiving beds. Feed gas to the PSA system contained 0.28 mol % N2, 4.43 mol % CH4, 4.37 mol % CO, 15.2 mol % CO2, and balance H2 at 35° C. and 23.1 atm (325 psig). The PSA cycle time was adjusted until the average CO content of the product gas was 5 ppm. The end-of-step (EOS) purge pressure at the bottom of the bed was 1.43 atm (6.3 psig).

Simulation results are listed in the below Table 1 and Table 2. These simulation results show that implementation of the modified activated carbon adsorbents reduced the magnitude of the temperature (T) swings in the activated carbon layer and increased the H2 recovery by roughly 0.4% compared to the base carbon case.

TABLE 1

Summary of PSA Process Simulation Results.

| Case | H2 recovery (%) | Layer depth of carbon (m) | Layer depth of zeolite (m) | Feed time (s) | Max carbon layer T swing (° C.) |
|---|---|---|---|---|---|
| Base activated carbon | 91.26 | 3.96 | 4.11 | 159 | 70.0 (−10 to 60) |
| Activated carbon with 3.8% loading of Ba(C2H3O2)2 | 91.65 | 3.81 | 4.27 | 169 | 60.0 (−2.2 to 57.8) |
| Activated carbon with 14.6% loading of KC2H3O2 | 91.68 | 3.96 | 4.11 | 180 | 57.2 (0 to 57.2) |

TABLE 2

Comparison of PSA Process Simulation Results And Pore Occlusion

| Case | Micropore volume (cc/g) | Micropores occluded (cc/g) | micropores occluded on a volume basis (%) | H2 recovery (%) |
|---|---|---|---|---|
| Base activated carbon | 0.36 cc/g | 0 cc/g | 0% | 91.26% |
| Activated carbon with 3.8% loading of Ba(C2H3O2)2 | 0.33 cc/g | 0.03 cc/g | 8.3% | 91.65% |
| Activated carbon with 14.6% loading of KC2H3O2 | 0.21 cc/g | 0.15 cc/g | 41.7% | 91.68% |

The above noted 3.8% loading of activated carbon with barium acetate equates to 0.15 mmol barium acetate per gram of activated carbon. The above noted 14.6% loading of activated carbon with potassium acetate equates to 0.49 mmol of potassium acetate per gram of activated carbon. These results show that a micropore occlusion of between 8% and 42% or between 8.3% and 41.7% on a volume basis (e.g. based on the volume occupied by one gram of the adsorbent material in cubic centimeters) can provide significant improvements in hydrogen recovery.

The simulations that were conducted utilized activated carbon as the adsorbent material and simulated a steam reforming process use of PSA for purification of hydrogen gas for a hydrogen gas product stream. Other embodiments can be adapted for other implementations or uses and can use other types of impregnated adsorbent material or metal acetates for the occlusion of micropores and/or macropores. For example, the adsorbent material can be zeolites, silica, activated alumina, or metal-organic framework (MOF) materials instead of activated carbon. The metal for the metal acetate can be an alkali metal, an alkaline earth metal, a transition metal, or a metalloid. As another example, the metal acetate can be barium acetate, beryllium acetate, calcium acetate, cesium acetate, copper acetate, iron acetate, lithium acetate, magnesium acetate, nickel acetate, potassium acetate, zinc acetate, zirconium acetate, or other suitable metal acetate. Combinations of two or more of these metal acetates can also be utilized.

As another example, the type of PSA system can be another type of PSA application that can purify an off gas or other gas stream output from another type of industrial process unit. For example, the PSA system having the adsorbent material with a minor portion of occluded micropores or occluded macropores can be a PSA system utilized to purify a stream of hydrogen in a partial oxidation process or to purify a feed of refinery off gas for H2 recovery from the refinery off gas.

The experimental results and simulation analyses shows that we have surprisingly found that adsorbent material with a minor portion of occluded micropores and/or a minor portion of occluded macropores can provide improved adsorption and yield even though the overall adsorption capacity of the material is reduced via the occlusions. The occlusion of micropores and/or macropores also helps facilitate a greater heat capacity for the adsorbent material so that the temperature difference of the bed of adsorbent material between the temperature of the bed during adsorption and desorption can be reduced.

These results are unexpected for a number of different reasons. For instance, an adsorbent with smaller micropore volume would be expected to have less adsorption capacity and therefore not be able to outperform a similar material that does not have a fraction of its micropores occluded. However, our testing and analysis shows that adsorbent material with occluded micropores can significantly outperform a similar material with a higher micropore volume. As another example, the heat capacity of the salt occluding the micropores and the adsorbent material having a minor portion of its pores being occluded has a higher heat capacity than calculated from using the heat capacity of each component and its percentage in the composite. This is also surprising as this type of increased heat capacity would not be expected.

For example, Table 3 below provides the measured and calculated heat capacities of the activated carbon samples loaded with potassium acetate and barium acetate discussed above in tables 1 and 2. Table 3 shows that the measured values of heat capacity are significantly higher than the calculated values. This is an unexpected result.

TABLE 3

Comparison of Measured and Expected Heat Capacities

| Case | Measured heat capacity | Calculated heat capacity | Difference between measured and calculated heat capacity |
|---|---|---|---|
| Activated carbon with 3.8% loading of Ba(C2H3O2)2 | 1.05 J/(g C) K | 0.66 J/(g C) K | 0.39 J/(g C) K |
| Activated carbon with 14.6% loading of KC2H3O2 | 0.92 J/(g C)° K. | 0.79 J/(g C) K | 0.13 J/(g C) K |

The activated carbon with 3.8% loading of barium acetate was measured to have a 59% higher heat capacity than what was expected via calculation (e.g. the measured value was 159% of the calculated value). The activated carbon with 14.6% loading of potassium acetate was measured to have a 16% higher heat capacity than what was expected via calculation (e.g. the measured value was 116% of the calculated value).

To perform the above calculated heat capacity for the potassium acetate sample, the activated carbon with 14.6% loading of potassium acetate had a total sample weight of 1.146 grams and the contribution to heat capacity was calculated as: ((0.146 g K acetate*1.11 J/g K)+(1 g activated carbon×0.63 J/g K))/1.00 g sample=0.79 J/(g C)/K for the composite adsorbent (where "g C" refers to a gram carbon). In contrast to this calculated expected heat capacity, the measured heat capacity was found to be 0.92 J/g K, which is 16% higher than expected (0.92/0.79=1.16).

To perform the above calculated heat capacity for the barium acetate sample, the activated carbon with 3.8% loading of barium acetate had a total sample weight of 1.038 g and the contribution to heat capacity was calculated as: ((0.038 g Ba acetate×0.84 J/g K)+(1 g carbon×0.63 J/g K))/1.00 g sample=0.66 J/(g C) K. In contrast, the measured heat capacity was 1.05 J/g K, which is 59% higher than expected (1.05/0.66=1.59).

As yet another example to show the surprising results we have found, the effect of salt addition to the adsorbent material has been found to be able to provide a non-linear relationship. For example, a small addition of barium acetate to the activated carbon produced a large increase in heat capacity and a further addition of barium acetate beyond a certain threshold actually decreased the heat capacity (See e.g. FIG. 6).

It was not expected that the impregnation of salts into the activated carbon to reduce the micropore volume would result in an improvement in adsorption processing or provide improved performance. In general, one would conventionally expect that higher micropore volume improves adsorbent capacity and subsequent PSA performance and it was conventionally believed that a higher micropore volume would improve PSA performance. In contrast to this conventional thinking, our above results show that even where there is significant reduction in the micropore volume of the carbon (up to 42% reduction) the performance of PSA processing can be improved. This is not an intuitive result, is contrary to conventional thinking, and was surprising and unexpected.

Figure 7:
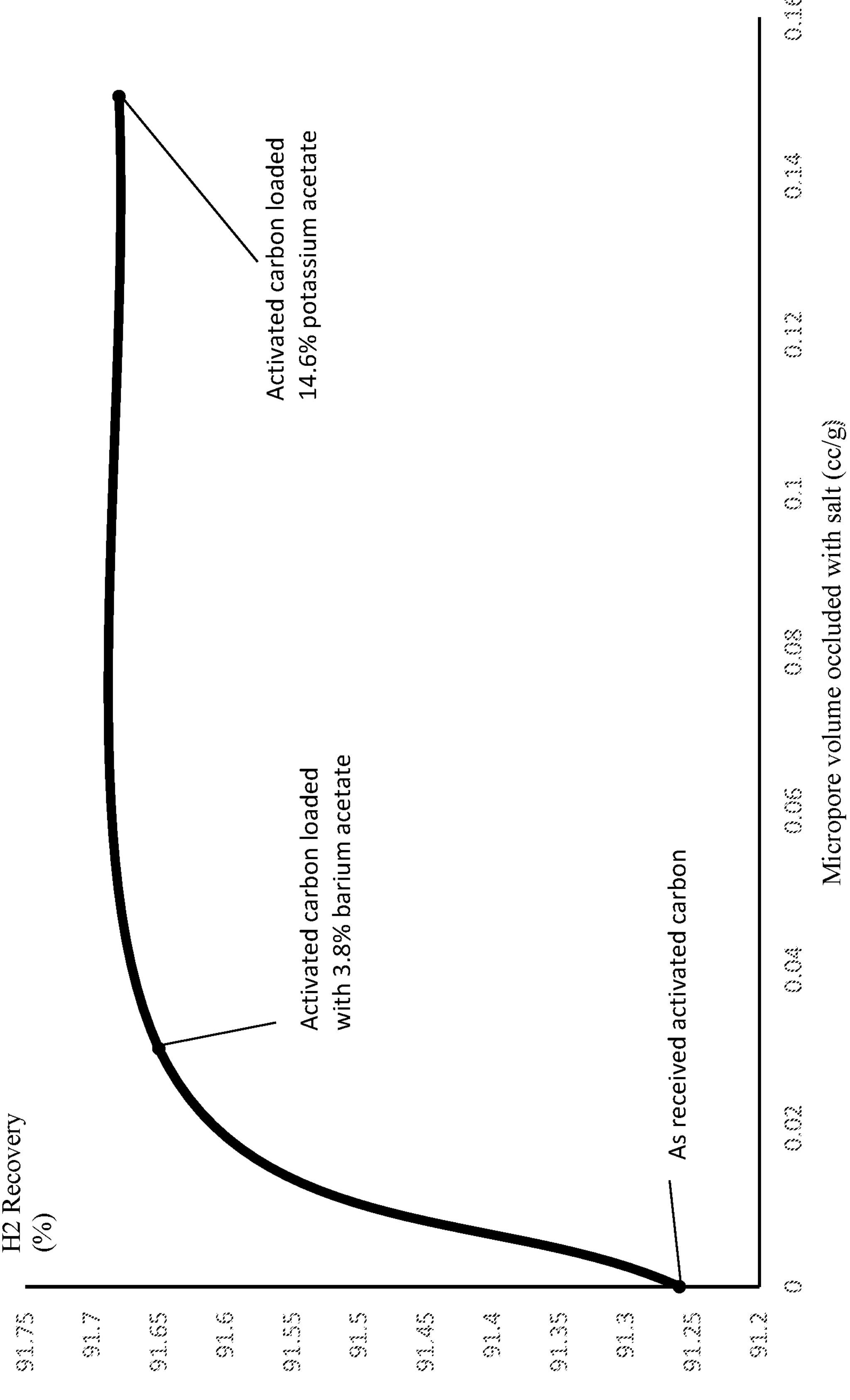
FIG. 7 is a graph illustrating hydrogen recovery (H2 recovery) results obtained from different samples that illustrate improved performance found to be obtainable with use of an adsorbent material having a minor portion of its micropores occluded.

FIG. 7 is a graph showing the effect of H2 PSA recovery versus activated carbon micropore volume for the three above noted cases (base activated carbon, activated carbon loaded with 3.8% barium acetate, and activated carbon loaded with 14.6% potassium acetate). As shown in FIG. 7, smaller micropore volume was found to be better. This is particularly surprising given that as the micropore occlusion goes from 0.03 cc/g occlusion to 0.15 cc/g, occlusion, the improved H2 recovery is unchanged. These results are very surprising and show occlusion of pores of adsorbent material for a minor portion of the pores can provide surprising and unexpected improvements in adsorption processing.

It should be appreciated that modifications to the embodiments explicitly shown and discussed herein can be made to meet a particular set of design objectives or a particular set of design criteria. For instance, the arrangement of valves, piping, and other conduit elements (e.g. conduit connection mechanisms, tubing, seals, etc.) for interconnecting different units of the adsorption system 1 for fluid communication of the flows of fluid between different units can be arranged to meet a particular plant layout design that accounts for available area of the plant, sized equipment of the plant, and other design considerations. As another example, the flow rate, pressure, and temperature of the fluid passed through an adsorber as well as passed through other plant elements can vary to account for different plant design configurations and other design criteria. As yet another example, embodiments can be utilized in conjunction with any type of adsorber vessel-radial, vertical, horizontal, vertical cross flow, etc. and the vessel 6*a* of each adsorber 6 can be any size or shape to meet a desired set of design criteria.

It should be appreciated that embodiments of the adsorption system 1 can be configured to include and/or utilize process control elements positioned and configured to monitor and control operations (e.g. temperature and pressure sensors, flow sensors, an automated process control system having at least one work station that includes a processor, non-transitory memory and at least one transceiver for communications with the sensor elements, valves, and controllers for providing a user interface for an automated process control system that may be run at the work station and/or another computer device of a plant or facility, etc.).

As another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of adsorbent material, adsorbers, adsorption systems, adsorption processing, and methods of making and using the same have been shown and described above, it is to be distinctly understood that the invention is not limited thereto but may be otherwise variously embodied and practiced within the scope of the following claims.

The invention claimed is:

1. An adsorber for an adsorption system comprising:

a vessel positionable to receive a fluid to purify the fluid, the vessel having a bed of adsorbent material;

the bed of adsorbent material comprising a first layer of adsorbent material having a minor portion of micropores occluded with at least one salt consisting of a metal cation and an anion comprised of carbon (C), hydrogen (H), and oxygen (O), or a minor portion of the micropores, mesopores, and macropores occluded with the at least one salt; and wherein the at least one salt is at least one metal acetate and the first layer of adsorbent material has the minor portion of micropores occluded with the at least one metal acetate, the minor portion of micropores occluded with the at least one metal acetate being less than 42% of the micropores of the adsorbent material of the first layer of adsorbent material being occluded and greater than 8% of the micropores of the adsorbent material of the first layer of adsorbent material being occluded on a volume basis.

2. The adsorber of claim 1, wherein the at least one salt is at least one metal acetate and the first layer of adsorbent material further has the minor portion of macropores occluded with the at least one metal acetate, the minor portion of macropores occluded with the at least one metal acetate being less than 20% of the macropores of the adsorbent material of the first layer of adsorbent material being occluded on a volume basis and greater than or equal to 2% of the macropores of the adsorbent material of the first layer of adsorbent material being occluded on a volume basis.

3. The adsorber of claim 1, wherein the at least one metal acetate is potassium acetate or barium acetate.

4. The adsorber of claim 1, wherein the at least one salt is at least one metal acetate and the first layer of adsorbent material further has the minor portion of macropores occluded with the at least one metal acetate, wherein the minor portion of macropores occluded with the at least one metal acetate is less than 15% of the macropores of the adsorbent material of the first layer of adsorbent material being occluded on a volume basis and greater than or equal to 3% of the macropores of the adsorbent material of the first layer of adsorbent material being occluded on a volume basis.

5. The adsorber of claim 1, wherein the minor portion that is occluded is between 0.03 cc/g of the micropores being occluded and 0.15 cc/g of the micropores being occluded.

6. The adsorber of claim 1, wherein the bed of adsorbent material comprises a second layer of adsorbent material.

7. A pressure swing adsorption system, comprising:

a vessel positionable to receive a fluid to purify the fluid, the vessel having a bed of adsorbent material;

the bed of adsorbent material comprising a first layer of adsorbent material having a minor portion of micropores occluded with at least one salt consisting of a metal cation and an anion comprised of carbon (C), hydrogen (H), and oxygen (O), or a minor portion of the micropores, mesopores, and macropores occluded with the at least one salt; and wherein the at least one salt is at least one metal acetate and the first layer of adsorbent material has the minor portion of micropores occluded with the at least one metal acetate, the minor portion of micropores occluded with the at least one metal acetate being less than 42% of the micropores of the adsorbent material of the first layer of adsorbent material being occluded on a volume basis and greater than 8% of the micropores of the adsorbent material of the first layer of adsorbent material being occluded on a volume basis.

8. The system of claim 7, wherein the at least one salt is at least one metal acetate and the first layer of adsorbent material further has the minor portion of macropores occluded with the at least one metal acetate, the minor portion of macropores occluded with the at least one metal acetate being less than 20% of the macropores of the adsorbent material of the first layer of adsorbent material being occluded on a volume basis and greater than or equal to 2% of the macropores of the adsorbent material of the first layer of adsorbent material being occluded on a volume basis.

9. The system of claim 7, wherein the at least one metal acetate is potassium acetate or barium acetate.

10. A process for making adsorbent material for adsorption processing, the process comprising:

exposing a solid particulate adsorbent material to a first salt solution for a pre-selected period of time for occlusion of a minor portion of micropores of the adsorbent material with at least one salt of the first salt solution, the at least one salt of the first salt solution comprising at least one salt consisting of a metal cation and an anion comprised of carbon (C), hydrogen (H), and oxygen (O) and wherein the at least one salt comprises a first metal acetate;

drying the adsorbent material;

exposing the solid particulate adsorbent material to a second salt solution comprising a second metal acetate for a pre-selected period of time for occlusion of a minor portion of micropores of the adsorbent material with the second metal acetate;

heating the adsorbent material after the adsorbent material was exposed to the first salt solution and the second salt solution to convert the first metal acetate to a first metal carbonate and to convert the second metal acetate to a second metal carbonate; and washing the adsorbent material to remove the first metal carbonate from the adsorbent material and facilitate positioning of the second metal carbonate in a minor portion of macropores of the adsorbent material.

11. The process of claim 10, wherein the minor portion of micropores of the adsorbent material that is occluded with the at least one salt of the first salt solution is less than or equal to 20% of the micropores of the adsorbent material being occluded and greater than or equal to 2% of the micropores of the adsorbent material being occluded on a volume basis.

12. The process of claim 10, comprising:

removing the solid particulate adsorbent material from the salt solution.

13. The process of claim 10, wherein the minor portion of macropores of the adsorbent material that is occluded with the second metal acetate is less than or equal to 20% of the macropores of the adsorbent material being occluded on a volume basis and greater than or equal to 2% of the macropores of the adsorbent material being occluded on a volume basis.

14. The process of claim 13, comprising:

removing the adsorbent material from the second salt solution.

15. The process of claim 13, wherein the washing is performed with water and the first metal carbonate is water soluble and the second metal carbonate is water insoluble.

16. The process of claim 15, wherein the first metal acetate is potassium acetate, the first metal carbonate is potassium carbonate, the second metal acetate is barium acetate and the second metal carbonate is barium carbonate.

* * * * *